May 3, 1927.
S. W. CRAMER ET AL
1,626,666
HUMIDIFIER
Filed Dec. 17, 1924
3 Sheets-Sheet 1
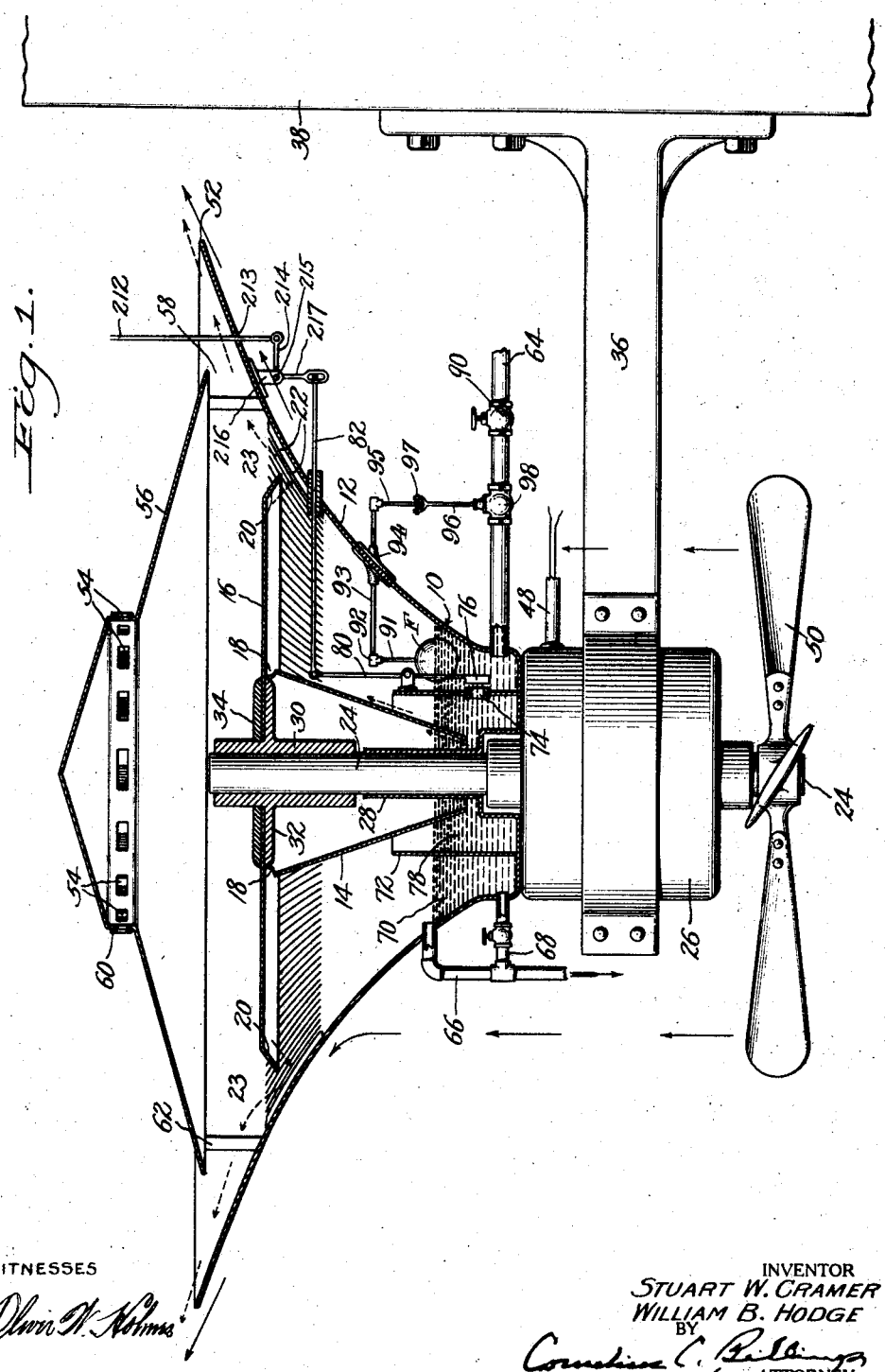
INVENTOR
STUART W. CRAMER
WILLIAM B. HODGE
BY
ATTORNEY

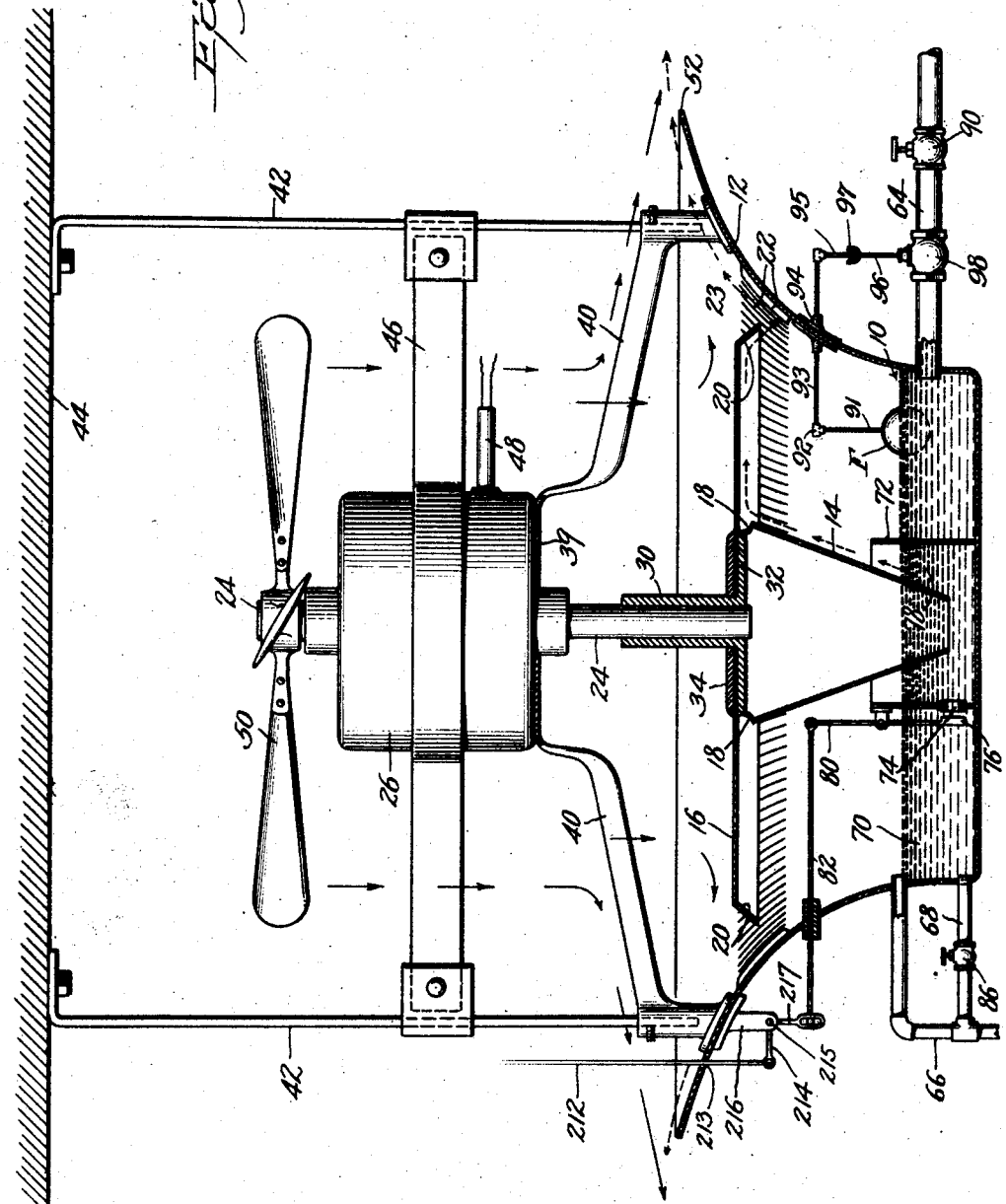

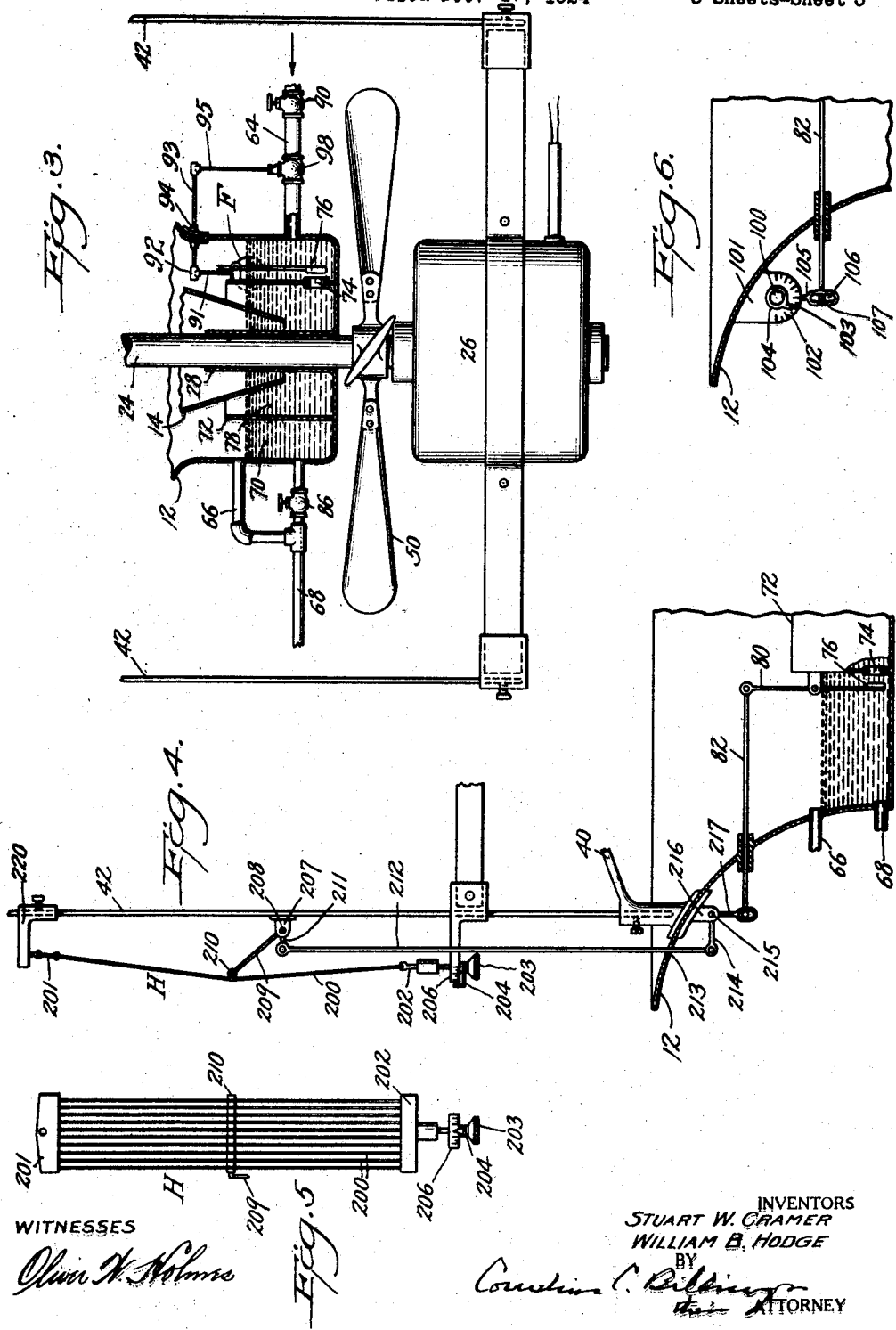

Patented May 3, 1927.

1,626,666

UNITED STATES PATENT OFFICE.

STUART W. CRAMER, OF CRAMERTON, AND WILLIAM B. HODGE, OF CHARLOTTE, NORTH CAROLINA, ASSIGNORS, BY DIRECT AND MESNE ASSIGNMENTS, TO WM. B. HODGE COMPANY, OF CHARLOTTE, NORTH CAROLINA, A CORPORATION OF NORTH CAROLINA.

HUMIDIFIER.

Application filed December 17, 1924. Serial No. 756,421.

This invention relates to a humidifier and, more particularly, to a humidifier of the large capacity, centrifugal, type for creating and distributing a mist of water and thus increasing the content of water vapor, in the atmosphere about the humidifier.

In the usual type of humidifiers heretofore used, water to be absorbed or vaporized in the atmosphere to be humidified is sprayed or atomized into a draught of air which is moving unidirectionally, either downwardly or horizontally. Accordingly, the tendency of the droplets or particles of sprayed water to fall or settle from the draught is aided by the movement of the draught of air. This not only lessens the time during which the water may evaporate from the suspended or falling drops but creates an objectionable spattering or splashing of the water on the floor or other surfaces about the apparatus.

An object of our present invention is to provide a simple and effective humidifying apparatus in which the tendency of the water particles or droplets in the mist to fall or settle out of the draught of air in which they are carried or suspended is resisted or opposed, and in which a rapid and wide distribution of the mist is obtained.

Another object of the invention is to provide a humidifier in which particles of water of too large a size to be carried in the draught of air are eliminated or prevented from being carried into the atmosphere and to insure the suspension and rapid distribution of the particles to enable them to be completely evaporated while in suspension.

A still further object of the invention is to provide a humidifier of the type outlined above in which the elements for forming water into a mist, removing the larger particles and suspending and distributing the mist of smaller particles, are of a compact construction and of a minimum of parts.

With these and other objects in view, the invention comprises the apparatus described and set forth in the following specification and claims.

The various features of the invention are illustrated in the accompanying drawings, in which:

Fig. 1 is an elevation, partly in section of a humidifier embodying a preferred form of the invention.

Fig. 2 is a similar elevation, partly in section, of a humidifier embodying a modified, simpler, form of the invention.

Fig. 3 is a view showing a modified arrangement of the fan.

Fig. 4 is a side elevation of the hygrostat adjusting mechanism.

Fig. 5 is an elevation of the hygrostat element.

Fig. 6 is a fragmentary view showing the mechanism of the valve adjustment.

In our present invention, a draught of air is created in a vertical direction, either upwardly or downwardly, and is deflected and spread radially outwardly in a substantially flat, spreading, stream. A mist of water particles small enough to readily float in the spreading draught of air until completely evaporated, is formed in a more slowly moving, or relatively quiescent, body of air, which is then entrained into the spreading draught, and is thus spread and diffused throughout the surrounding atmosphere. To form this mist, a stream of water is drawn from a supply container to the surface of a rapidly rotating plate or disc and is thrown outwardly over the surface of the disc by centrifugal action and projected from the edge of the plate as a fine mist against a stationary receiving surface on which the larger particles are retained or are broken up into smaller particles and thrown into suspension in the adjacent, relatively quiescent air, from which the larger particles readily settle out. The larger particles thus settling out or caught on the retaining surface, which is preferably corrugated, are received on a surface which converges downwardly and leads into the supply container. To more effectively break up the stream of water as it is projected from the rotating plate, the edge of the plate is preferably sharply bent towards the corrugated drop receiving surface.

Referring more particularly to the accompanying drawings, a supply of water to be broken into a mist and distributed throughout an atmosphere to be humidified is contained in a supply container 10 having upwardly and outwardly flaring side walls 12. A stream of water is drawn by centrifugal action upwardly from the central portion of the container 10 by means of a rotating inverted, frustro-conical member 14 depending from a horizontal, rotating plate or disc 16 and dipping into the body of water in the container 10. As the plate 16 is rapidly rotated, a sheet of water is drawn upwardly over its inner and outer surfaces as indicated by the broken line arrows, to the under surface of the plate 16 and is then thrown outwardly along the under surface of the plate, openings 18 being provided in the upper edge or base of the member 14, when desired, to permit the water on the inner surface of the member to reach the under surface of the plate. As the outwardly moving sheet of water reaches the outer portion of the plate 16, it is deflected sharply downwardly by a downwardly turned rim or edge portion 20 and thrown against a corrugated surface 22 on the inner surface of the outwardly flaring walls 12 of the container 10. As the water strikes the downwardly turned rim or edge portion 20 and is deflected it is spread thinly and uniformly as it is thrown off, and it is thereby broken up into small particles and projected against the corrugated surface 22. As a result of this centrifugal breaking up of the sheet of water, a mist of fine particles or droplets is formed in the atmosphere 23 about or above the corrugated surface 22. As this atmosphere is relatively quiescent, any larger particles thrown thereinto, which would not remain in suspension sufficiently long to entirely evaporate, readily settle out of the mist onto the surface 12 and flow back into the container 10.

The plate 16 and member 14 may be supported and rotated in any suitable manner. As shown in Fig. 1, the plate 16 is supported on the upper end of a shaft 24, which extends from a driving motor 26, placed beneath the container 10 upwardly through an encircling wall 28 in the container and provided at its upper end with a collar 30 having a supporting flange 32 and a holding washer 34 for mounting the plate thereon. The motor 26 may be supported by means of a bracket 36 projecting from a supporting post 38 or by other suitable means.

In the modification shown in Fig. 2, the driving motor 26 is mounted above the plate 16 by means of a supporting spider 39 having radially and downwardly extending arms 40 secured to the inner upper surface of the walls 12, and the shaft 24 extends downwardly from the motor to a position to support the plate 16. In this form the apparatus is illustrated as supported by means of hangers 42 depending from a ceiling 44 and the motor may be further guided and supported by means of horizontal bars 46 extending between the hangers 42. In each form of the invention, the motor may be driven by a suitable electric current supplied through mains 48.

The motor 26 also serves in each form of embodiment to drive a fan 50 for creating a distributing draught of air by which the suspended particles of the mist in the atmosphere 23 are carried outwardly in the surrounding atmosphere and distributed in such a manner as to come into intimate contact with the relatively dry atmosphere and to readily evaporate.

In the form of the invention shown in Fig. 1, the fan 50 is mounted beneath the motor 26 and directs a draught of air upwardly against the under surface of the flaring walls 12 of the container 10. The draught of air is then deflected by the walls 12 and spread outwardly in a substantially flat sheet leaving the edges 52 of the walls in a spreading, slightly upward moving sheet, as indicated by the arrows.

The movement of this sheet of air entrains air from above the edge of the wall 12 and creates a slight suction. Under the influence of this suction, a slowly moving current of air is drawn through a number of inlet openings 54 in the upper portion of a cone shaped cap or cover member 56 the lower, outer edge of which reaches downwardly to overlie the space 23 and form with the upper inner surface of the walls 12 an annular outlet 58 through which the air is drawn. This slow current of air takes up the mist particles in the space 23 and carries them into the draught of air at the outer edge of the walls, without creating sufficient velocity to carry the heavier drops of water. The capacity of the humidifier in this form of embodiment may be controlled by controlling the inlet of air through the inlet openings 54 by means of a suitable damper 60. The cap 56 is supported from the upper edges of the walls 12 by means of posts 62 which permit the cap to be raised or lowered to control the area of the annular outlet 58.

As clearly shown in Fig. 3, the fan 50 may be advantageously secured to the shaft 24, in a position substantially midway between the driving motor 26 and the water container 10. By so placing the fan 50 above the motor, an element of safety is obtained by minimizing the danger of any one being harmed by the fan when in operation.

In the form of embodiment shown in Fig. 2, the fan 50 is mounted above the motor 26 and directs a draught of air downwardly towards the top of the plate 16, which is exposed to the draught. The draught is deflected and spread before reaching the surface of the plate 16 by a body of dead, or quiet, air pocketed above and on the upper surface of the plate 16, the main course of the air being as indicated by the full arrows. A portion of the air, however, diffuses into and slowly entrains the atmosphere 23 immediately above the edge of the plate 16 and serves to slowly move this atmosphere into the outwardly spreading draught and thus bring the particles of the mist thereinto to be distributed throughout the surrounding atmosphere. The arms 40 of the spider 39 are made wide or flat in a vertical direction so as to oppose the circulating or swirling motion that might be given to the air above the disc and thus avoid the lifting or carrying action that might be given to the mist thereby.

Water may be supplied to the container 10 in any suitable manner. In the forms shown in the drawings, a supply of water is supplied through a pipe 64 provided with a hand operated by-pass valve 90 and a circulation of the water and a constant level in the container are obtained by permitting the excess of water not formed into a mist by the plate 16 to overflow through an overflow pipe 66. In the compartment 70 of the container 10 a float valve structure is provided consisting of a float F from which projects a rod 91 connected by a suitable joint 92 to a rod 93, which passes through a flexible joint 94 in the wall 12. The rod 93 is connected to a valve 98 by rods 95 and 96 connected together by a universal joint 97. The float will thus rise and fall with the water in the compartment 70 to close and open the valve 98 at a predetermined water level. A valved by-pass pipe 68 may be provided between the lower part of the container 10 and the overflow pipe 66 for the purpose of draining the container. The water supplied through the pipe 64 is received in an outer annular compartment 70 formed in the container 10 by means of a circular wall 72 and from this compartment is admitted through an opening 74 in the wall controlled by means of a plug valve 76 to an inner compartment 78 into which the lower end of the member 14 dips. The position of the plug valve 76 relative to the opening 74 may be controlled to regulate the flow of water into the compartment 78 by means of a lever 80 on the lower end of which the plug valve 76 is mounted and which is in turn controlled by means of an operating rod 82 which is moved either manually, by the construction shown in Fig. 6, or automatically by means of a hygrostat to which it is suitably connected, as by the construction shown in Fig. 4.

Referring to Fig. 6, the manual adjustment is obtained by mounting the handle 100 on a supporting part 101 secured to the side wall 12, the part 101 being provided with a scale 102, the handle being provided with a pointer 103. Depending from the pivot 104 of the handle is a rod 105 provided with an elongated slot 106, which engages a projecting portion 107 extending from the rod 82. By means of this construction, when the handle 100 is turned, the pointer runs over the scale 102 and the rod 82 can thus be drawn back and forth and the valve 76 opened to any predetermined and set extent.

Referring to Figs. 4 and 5 the automatic control is governed by a hygrostat H which consists preferably of a band of fibers 200, such as silk, cotton or hair, which are secured to bridges 201 and 202. The bridge 201 is pivotally secured to the bracket 220, which is supported upon the hanger 42. The fibers are adjusted into position by means of a thumb screw 203 mounted in the standing part 206 and connected with the lower bridge 202. A pointer 204 on the thumb screw 203 runs over a scale 205 on the standing part 206. There is also secured to the hanger 42 a projection 207 upon which is pivoted at 208 a bell crank lever 209, having a weight 210 secured at the upper free end, which weight bears with some tension against the fibers 200 of the hygrostat H. The shorter arm 211 of the bell crank lever 209 is pivoted to a rod 212 which passes through the wall 12 at 213 and is secured to an arm of a bell crank lever 214 pivoted at 215 upon a projection 216 extending from the underside of the wall 12, the lower arm 217 of this bell crank lever being pivoted to the operating rod 82 which controls the movements of the valve 76.

As the moisture in the air surrounding the hygrostat increases, the fibers of the element when of cotton will shorten, thus raising the rod 212 which in turn draws the rod 82 outwardly to close the valve 76 as clearly shown in Fig. 2. When the moisture decreases the valve 76 is similarly opened.

Inasmuch as silk and hair fibers lengthen when the humidity of the air surrounding them increases, it is obvious that when fibers of these materials are used in the hygrostat, the bell-crank mechanism connecting the valve would be arranged so that the changes in humidity of the surrounding air will cause the valve 76 to be actuated in the proper directions.

The adjustment of the automatic control by means of the construction above described is effected by turning the head of the screw in one direction or the other so that the initial setting of the valve 76 can be secured.

By providing two adjacent communicating tanks of water, into one of which the supply of water initially flows, and from the other of which the water is drawn to form a mist, the operator is enabled by the valve construction thus described to provide sufficient water to meet the necessities of the case. That is to say, when the surrounding air is laden with moisture it is obvious that the supply of water for forming the mist need only be at its minimum whereas when the air is dry, the supply of water should be at its maximum. This condition is attained by means of the operation of the valve governing the flow of water from one tank to the other. Without such a construction, the supply tank must be kept always at its maximum which would frequently supply more water than is needed to effectively form the required mist.

Through the above invention, therefore, water is drawn upwardly by the member 14 and thrown centrifugally outwardly against the corrugated surface 22 and broken up into a fine mist which is entrained by and carried in suspension outwardly by the draft created by the propeller 50 into the surrounding atmosphere to evaporate, and thus humidifying the said atmosphere. The larger particles of water falling onto the wall 12 run back into the container 10, the form of the container providing a very simple, compact apparatus for this purpose.

As changes of construction could be made within the scope of our invention, it is intended that all matter contained in the above description or shown in the accompanying drawings be interpreted as illustrative and not in a limiting sense.

Having described our invention, what we claim and desire to secure by Letters Patent is:

1. Apparatus of the type described which comprises, a liquid container having an outwardly flaring side wall, means for creating a blast of air against the outer surface of said container and deflecting it outwardly past the edge of said container, and means for projecting liquid from said container centrifugally outwardly against the inner surface of said outwardly flaring wall and out of the path of said blast of air, the wall of said container preventing passage of any of said blast of air into contact with said liquid within said container.

2. Apparatus of the type described which comprises, a liquid container having an outwardly flaring side wall, means for creating a blast of air against the outer surface of said container and deflecting it outwardly past the edge of said container, a corrugated inner surface on the wall of said container, and means for projecting liquid from said container centrifugally outwardly against said corrugated surface and out of the path of said blast of air, the wall of said container preventing passage of any of said blast of air into contact with said liquid within said container.

3. Apparatus of the type described which comprises, a liquid container having side walls flaring outwardly at its upper end and having corrugations on its inner surface, a rotatable plate having an edge bent towards said corrugated surface, rotatable means for drawing liquid from said container to said plate, and means for directing a current of air radially outwardly in a sheet adjacent the edge of said container.

4. Apparatus of the type described which comprises, a liquid container having a side wall flaring outwardly at its upper end and having corrugations on its inner surface, a rotatable plate having an edge bent towards said corrugated surface, and an inverted, frustro-conical member mounted from the under side of said plate and depending into said container.

5. Apparatus of the type described which comprises, a liquid container having a side wall flaring outwardly at its upper end, rotatable for drawing liquid upwardly from said container and throwing it outwardly against the inner surface of said flaring wall, and a fan for directing a blast of air upwardly against the under surface of said flaring wall.

6. Apparatus of the type described which comprises, a liquid container having a side wall flaring outwardly at its upper end, a horizontal, rotating plate having an edge portion bent towards the inner surface of said flaring wall, means for supplying liquid to the surface of said plate, and means for directing a blast of air against the lower, outer, surface of said flaring wall.

7. Apparatus of the type described which comprises, a liquid container having a side wall flaring outwardly at its upper end and having corrugations on its inner surface, a rotatable plate having an edge bent towards said corrugated surface, an inverted frustro-conical member mounted from the under side of said plate and depending into said container, and a fan mounted beneath said container to direct a blast of air upwardly against the lower outer surface of said flaring wall.

8. Apparatus of the type described which comprises, a liquid container having a side wall flaring outwardly at its upper end and having corrugations on its inner surface, a motor mounted beneath said container and having a shaft extending upwardly therethrough, a flat horizontal plate having an edge sharply bent towards said corrugated surface mounted on the upper end of said shaft, and a fan mounted on and driven by said motor.

9. Apparatus of the type described which comprises, a liquid container having a side wall flaring outwardly at its upper end and having corrugations on its inner surface, a motor mounted beneath said container and having a shaft projecting upwardly therethrough, a horizontal plate mounted on the upper end of said shaft and having an edge bent sharply towards said corrugated surface, an inverted frustro-conical member mounted on said plate and provided with holes at its base below and adjacent to said plate, and a fan mounted on said motor to direct a draught of air upwardly against the outer surface of said flaring wall.

10. Apparatus of the type described which comprises, a liquid container having a side wall flaring outwardly at its upper end and having corrugations on its inner surface, a motor mounted beneath said container and having a shaft projecting upwardly therethrough, a horizontal plate mounted on the upper end of said shaft and having an edge bent sharply towards said corrugated surface, an inverted frustro-conical member mounted on said plate, encircling said shaft and depending into said container, and a fan mounted on said motor to direct a draught of air upwardly against the outer surface of said flaring wall.

11. Apparatus of the type described which comprises a water container having a side wall flaring outwardly at its upper end, an annular partition wall in said container dividing said container into an inner compartment and an outer compartment, a horizontally rotating plate having an edge portion bent toward the inner portion of said flaring wall, means for drawing water from said inner compartment to the surface of said plate whereby said water is thrown against said flaring wall and runs back to said outer compartment, means for directing a blast of air against the lower outer surface of said flaring wall, means for withdrawing water from said outer compartment, means for maintaining the level of water in said outer compartment substantially constant, a valve for regulating the flow of water from said outer compartment to said inner compartment, and automatic means for controlling the position of said valve.

12. Apparatus of the type described which comprises, a container having an upwardly and outwardly flaring side wall, a motor beneath said container, a fan between said container and said motor to create a draught upwardly along the side wall of said container, and means for drawing water from the lower part of said container and centrifugally throwing it against the inner surface of said flaring side wall.

STUART W. CRAMER.
WILLIAM B. HODGE.